(12) United States Patent
Zheng et al.

(10) Patent No.: US 8,530,746 B2
(45) Date of Patent: Sep. 10, 2013

(54) POLYIMIDES AND FLUOROPOLYMER BONDING LAYER WITH IMPROVED INTERNAL ADHESIVE STRENGTH

(75) Inventors: Haibin Zheng, Pearland, TX (US); Gregory Douglas Clements, Houston, TX (US); Grant Richard Lee, Deer Park, TX (US)

(73) Assignee: Kaneka North America LLC, Pasadena, TX (US)

( * ) Notice: Subject to any disclaimer, the term of this patent is extended or adjusted under 35 U.S.C. 154(b) by 266 days.

(21) Appl. No.: 12/810,889

(22) PCT Filed: Dec. 22, 2008

(86) PCT No.: PCT/US2008/013992
§ 371 (c)(1),
(2), (4) Date: Jun. 28, 2010

(87) PCT Pub. No.: WO2009/085255
PCT Pub. Date: Jul. 9, 2009

(65) Prior Publication Data
US 2010/0282488 A1    Nov. 11, 2010

Related U.S. Application Data

(60) Provisional application No. 61/009,367, filed on Dec. 28, 2007, provisional application No. 61/070,712, filed on Mar. 25, 2008.

(51) Int. Cl.
*H01B 7/00* (2006.01)

(52) U.S. Cl.
USPC ................................ 174/120 R

(58) Field of Classification Search
USPC ....................................... 174/120 R
See application file for complete search history.

(56) References Cited

U.S. PATENT DOCUMENTS

| 3,616,177 | A |   | 10/1971 | Gumerman |
|---|---|---|---|---|
| 4,801,501 | A | * | 1/1989 | Harlow ................. 428/383 |
| 5,006,411 | A | * | 4/1991 | Motonari et al. ......... 428/421 |
| 5,106,673 | A |   | 4/1992 | Effenberger et al. |
| 5,399,434 | A |   | 3/1995 | Katz et al. |

(Continued)

FOREIGN PATENT DOCUMENTS

GB    1 126 012    9/1968

OTHER PUBLICATIONS

PCT International Search Report, International Application No. PCT/US/2008/013992, pp. 1-3, Oct. 30, 2009.

*Primary Examiner* — Chau Nguyen
(74) *Attorney, Agent, or Firm* — Kagan Binder, PLLC

(57) ABSTRACT

Multilayer polyimide-fluoropolymer insulation structures exhibiting excellent heat seal strength and superior internal adhesion strength comprise a base layer of polyimide having first and second major surfaces and a first fluoropolymer layer. The first fluoropolymer layer may be on the first major surface of the polyimide layer. Alternatively, it may be separated from the first major surface of the polyimide layer by an intervening layer. The first fluoropolymer layer comprises from about 70 to about 98% by weight of fluoroethylene propylene polymer ('FEP') and from about 30 to about 2% by weight of polytetrafluoroethylene polymer ('PTFE') or poly(tetrafluoroethylene-co-perfluoro[alkyl vinyl ether]) ('PFA') based on the total weight of the first fluoropolymer layer. Structures having fluoropolymer layers on both surfaces of the polyimide layer are also provided. Protected wire or cable using the composite, and methods are also described.

19 Claims, 2 Drawing Sheets

(56) References Cited

U.S. PATENT DOCUMENTS

| | | |
|---|---|---|
| 5,731,088 A | 3/1998 | La Court |
| 5,846,355 A | 12/1998 | Spencer et al. |
| 7,022,402 B2 | 4/2006 | Lacourt |
| 2005/0013998 A1* | 1/2005 | Lacourt .................. 428/377 |
| 2008/0305316 A1* | 12/2008 | Kaneshiro et al. ............ 428/220 |
| 2009/0250243 A1* | 10/2009 | Zhu et al. ................. 174/120 R |

* cited by examiner

US 8,530,746 B2

POLYIMIDES AND FLUOROPOLYMER BONDING LAYER WITH IMPROVED INTERNAL ADHESIVE STRENGTH

This application claims benefit from International Application No. PCT/US2008/013992, which was filed on Dec. 22, 2008, which in turn claims priority to U.S. Provisional Patent Application No. 61/009,367, which was filed on Dec. 28, 2007, and U.S. Provisional Patent Application No. 61/070,712, which was filed on Mar. 25, 2008, wherein the entireties of said patent applications are incorporated herein by reference.

FIELD OF THE INVENTION

The present invention relates to a multilayer polyimide-fluoropolymer insulation structure having superior adhesion strength. The insulation structures are in one embodiment useful for wrapping wire or cable or for supporting electronic circuitry.

BACKGROUND OF THE INVENTION

Electro-magnetic energy conductors are conventionally coated with a jacket to protect against catastrophic failures of the electro-magnetic system by short circuit. A number of materials have been used as protective jackets, such as polyvinyl chloride (PVC), polyurethane, polyimide, polytetrafluoroethylene (PTFE), expanded PTFE, fluorinated ethylene propylene, perfluoroalkoxy polymer, polyesters, silicone rubber, and nylon. These materials have been applied over the conductors in a variety of ways, including by extrusion, tape wrap, insertion within pre-formed tubes, shrink wrap, etc. As a specific example, U.S. Pat. No. 5,846,355 describes a jacket material comprising a silicone material that is imbibed into a porous polymer, such as expanded polytetrafluoroethylene, to produce a flexible and durable composite.

Various laminar structures comprising polyimide and a combination of certain fluoropolymer layers have been described for use as an insulating wire or cable wrap. For example, U.S. Pat. No. 3,616,177 discloses a construction comprising at least three layers, including a base polyimide layer, a layer of fluoroethylene propylene (FEP) copolymer and a layer of polytetrafluoroethylene (PTFE) copolymer. This patent further describes a four layer construction having FEP on both sides of the polyimide base layer, with a layer of PTFE on of the FEP layers. See column 1, lines 37-45. An alternative construction is disclosed in U.S. Pat. No. 5,399,434, which describes a tape having a polyimide core layer, inner fluorinated ethylenepropylene copolymer (FEP) layers, intermediate polytetrafluoroethylene homopolymer (PTFE) and fluorinated ethylenepropylene copolymer (FEP) blend layers and outer fluorinated ethylenepropylene copolymer (FEP) layers for use as an insulating wire or cable wrap.

U.S. Pat. No. 7,022,402 describes a film used to wrap electrically conductive materials, particularly for aerospace, high voltage machinery and/or other high performance applications. The film is an asymmetric multi-layer insulative film made by combining a layer of polyimide and a high-temperature bonding layer, the high-temperature bonding layer being derived from a high temperature base polymer made of poly(tetrafluoroethylene-co-perfluoro[alkyl vinyl ether]) (PFA) and optionally blended with from 0 to 60 weight percent poly(tetrafluoroethylene-co-hexafluoropropylene) (designated "FEP" therein). See the Abstract and the Field of Invention. A high modulus polyimide film is preferred for use as the core layer in order to provide the desired mechanical toughness, though films with a lower modulus may also be used. See column 7, lines 55-62.

U.S. Pat. No. 5,106,673 to Effenberger, et al. describes a multi-layer film stated to have improved adhesive strength and other properties. The film is made by combining a layer of polyimide and one or more layers of fluoropolymer selected from the group consisting of PTFE, thermally compatible TFE copolymers, blends thereof, $PVF_2$, thermally compatible $VF_2$ copolymers, blends thereof, PCTFE, thermally compatible CTFE copolymers, and blends thereof. See the Abstract. FEP is listed as a TFE copolymer in this patent (see column 5, line 27). However, it is also an object of the invention disclosed therein to reduce or eliminate the tendency of laminations made using polyimide and fluoropolymer tapes to arc-track by maximizing the PTFE content of the total fluoropolymer present (see column 3, line 3 to 7). To this end, Effenberger teaches that the adhesive layers should contain at least 40% by volume PTFE. See column 6, line 36 to 41.

U.S. Pat. No. 5,731,088 to La Court discloses a multi-layer composite comprising a polyimide film, a first layer of FEP bonded to both sides of the polyimide film, and a layer of a blend of PTFE and FEP bonded to one of the FEP layers. La Court stated that the "FEP coating provides excellent bonding of the polyimide copolymer base film layer to the subsequently applied PTFE-FEP blend layers. Without the FEP coating, the PTFE-FEP blend layers do not bond very well to the polyimide copolymer base layer unless the proportion of FEP in the blend is at least about 50%." See column 4, lines 41-46. However, to achieve the desired arc-track resistance, La Court asserted that "the PTFE-FEP blend must contain at least 40 weight % and, preferable up to 90 weight % of the PTFE homopolymer." See column 4, lines 56-59.

Kaneka Texas Corporation currently sells fluorocarbon coated polyimide films, such as APICAL Type AF Polyimide film designated 120AF616, which contains a polyimide base layer and 100% FEP layers bonded to both sides of the polyimide base layer. Similarly, DuPont Company currently sells a fluorocarbon coated polyimide film designated Kapton® FN, which is a general purpose polyimide film that is coated or laminated on one or both sides with Teflon® FEP fluoropolymer.

It is desirable to provide an insulation structure useful for aerospace wires or cable applications having improved heat strength and abrasion resistance.

SUMMARY OF THE INVENTION

A multilayer of polyimide-fluoropolymer insulation structure comprising:
  a) a base layer of polyimide having first and second major surfaces; and
  b) a first fluoropolymer layer;
wherein the first fluoropolymer layer comprises from about 70 to about 98% by weight of fluoroethylene propylene polymer ("FEP") and from about 30 to about 2% by weight of polytetrafluoroethylene polymer ("PTFE") or poly(tetrafluoroethylene-co-perfluoro[alkyl vinyl ether]) ("PFA") based on the total weight of the first fluoropolymer layer.

The multilayer polyimide-fluoropolymer insulation structure as described herein exhibits excellent heat seal strength when used in aerospace wires and cable applications.

In the present invention, in the case that the first fluoropolymer layer is on the first major surface of the polyimide and comprises from about 70 to about 98% by weight (preferably from about 75 to about 98% by weight) of FEP and from about 30 to about 2% by weight (preferably from about 25 to about 2% by weight) of PTFE based on the total weight of the first fluoropolymer layer, the multilayer of polyimide-fluoropolymer insulation structure in particular exhibits excellent internal adhesive strength and shelf life properties (Hereinafter, referred to as the first embodiment). The composite additionally exhibits surprising mechanical abrasion properties and electrical insulation properties as demonstrated by superior arc-tracking resistance.

In the present invention, In the case that the first fluoropolymer layer comprises from about 70 to about 98% by weight (preferably from about 70 to about 90% by weight) of FEP and about 30 to about 2% by weight (preferably from about 30 to about 10% by weight) of PFA based on the total weight of the first fluoropolymer layer, the multilayer of polyimide-fluoropolymer insulation structure in particular exhibits excellent copper adhesive strength properties (Hereinafter, referred to as the second embodiment).

In either the first or the second embodiment, the first fluoropolymer layer may directly contact the first major surface of the base layer if desired. Alternatively, it may be separated from the first major surface of the base layer by one or more intervening layers. The multilayer polyimide-fluoropolymer insulation structure additionally exhibits excellent internal adhesion strength properties.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

As noted above, the multilayer insulation structure of the present invention comprises at least a base layer of polyimide having first and second major surfaces and a first fluoropolymer layer. In a preferred embodiment, the insulation structure of the present invention further comprises a second fluoropolymer layer.

The following drawing describes the embodiment where the insulation structure is provided with a fluoropolymer layer on both sides of the polyimide layer. From this description, the embodiment having a fluoropolymer layer on only one side of the polyimide layer will be immediately understood.

Figure 1:
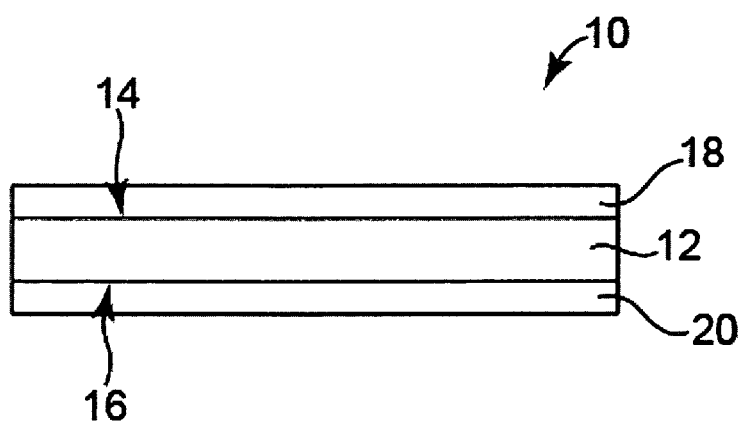
FIG. 1 is a cross sectional side view of an embodiment of the present invention.

Turning to the drawing, FIG. 1 is a cross sectional side view of an embodiment of the present invention, wherein composite 10 comprises polyimide layer 12 having first major surface 14 and second major surface 16. First fluoropolymer layer 18 is on first major surface 14 of polyimide layer 12. Second fluoropolymer layer 20 is on second major surface 16 of polyimide layer 12. For purposes of orientation, if first fluoropolymer layer 18 has a different chemical constitution from second fluoropolymer layer 20, first fluoropolymer layer 18 is defined as the layer that contacts the metal component of the protected wire or cable construction, or the polyimide to metal ("PTM") layer. Second fluoropolymer layer 20 is defined as the layer intended to contact additional composite material in an overwrap configuration (the layer therefore being designated the "bonding layer"), or to be the outer layer of a protected wire or cable construction.

In an embodiment of the present invention, the first fluoropolymer layer 18 and the second fluoropolymer layer 20 independently each hive a thickness of from about 0.05 to about 0.2 mil. In an embodiment of the present invention, the thickness of the polyimide layer 12 ranges from about 0.5 to about 5 mil.

Selection of the materials to form fluoropolymer layers 18 and 20 has been found to be important aspects of the present invention.

Specifically, the first and second fluoropolymer layers independently may comprise from about 70 to about 98% by weight (preferably from about 75 to about 98% by weight) of FEP and from about 30 to about 2% by weight (preferably from about 25 to about 2% by weight) of PTFE based on the total weight of the first fluoropolymer layer. In an embodiment of the present invention, the first fluoropolymer layer 18 and the second fluoropolymer layer 20 independently comprise from about 85 to about 95% FEP and from about 15 to about 5% by weight of PTFE based on the total weight of the fluoropolymer layer. This selection of fluoropolymer layer materials provides an insulation structure exhibiting exceptional internal adhesion properties, in addition to providing other properties such as arc-tracking resistance and abrasion resistance.

Alternatively, the first and second fluoropolymer layers independently may comprise from about 70 to about 98% by weight (preferably from about 70 to about 90% by weight) of FEP and about 30 to about 2% by weight (preferably from about 30 to about 10% by weight) of PFA based on the total weight of the first fluoropolymer layer. In an embodiment of the present invention, the first fluoropolymer layer 18 and the second fluoropolymer layer 20 independently comprise from about 85 to about 95% FEP and from about 15 to about 5% by weight of PFA based on the total weight of the fluoropolymer layer. This selection of fluoropolymer layer materials provides an insulation structure exhibiting exceptional copper adhesion properties, in addition to providing other properties such as arc-tracking resistance and abrasion resistance.

The fluoropolymer layer(s) may optionally comprise a polymer in addition to FEP and PFA or FEP and PTFE that is not a fluoropolymer. Alternatively, the fluoropolymer layer(s) may optionally comprise a polymer in addition to FEP and PFA that is a fluoropolymer. The additional polymer preferably is selected from, PPVE, PTFE or PFA, chlorotrifluoroethylene polymer (CTFE), tetrafluoroethylene chlorotrifluoroethylene copolymer (TFE/CTFE), ethylene chlorotrifluoroethylene copolymer (ECTFE), poly(ethylene-co-tetrafluoroethylene) (ETFE), polyvinylidene fluoride (PVDF), and combinations thereof.

The polyimide layer is generally derived from a polyamic acid precursor. In general, the polyamic acid is prepared by dissolving substantially equimolar amounts of an aromatic acid dianhydride and an aromatic diamine in an organic solvent and stirring the resulting solution at a controlled temperature until the polymerization of the acid dianhydride and the diamine is completed. The polyamic acid precursor can also comprise conventional (or non-conventional) catalysts and/or dehydrating agent(s).

The polyamic acid of the present invention can be polymerized by any known methods. Particularly, the following polymerization methods are preferable.

(1) A method in which aromatic diamine is dissolved in an organic polar solvent and reacted therein with essentially an equimolar amount of aromatic tetracarboxylic dianhydride for polymerization.

(2) A method in which an excess molar amount of aromatic tetracarboxylic dianhydride is reacted with an aromatic diamine compound in an organic polar solvent so as to obtain a pre-polymer having acid anhydride groups at the both ends. Subsequent polymerization is carried out using the aromatic diamine compound such that the aromatic tetracarboxylic dianhydride becomes essentially equimolar with the aromatic diamine compound in all steps of production.

(3) A method in which aromatic tetracarboxylic dianhydride is reacted with an excess molar amount of an aromatic diamine compound in an organic polar solvent so as to obtain a pre-polymer having amino groups at the both ends. Subsequent polymerization is carried out by adding an aromatic diamine compound in the pre-polymer and using the aromatic tetracarboxylic dianhydride so that the aromatic tetracarboxylic dianhydride becomes essentially equimolar with the aromatic diamine compound.

(4) A method in which aromatic tetracarboxylic dianhydride is dissolved and/or dispersed in an organic polar solvent and is polymerized using an aromatic diamine compound of an equimolar amount.

(5) A method in which polymerization is carried out by a reaction of a mixture of equimolar amounts of aromatic tetracarboxylic acid dianhydride and an aromatic diamine compound in an organic polar solvent.

The following describes materials used to produce the precursor of polyimide, i.e., the polyamic acid of the present invention.

Examples of acid anhydrides used to produce the polyamic acid include: pyromellitic dianhydride; 2,3,6,7-naphthalene tetracarboxylic dianhydride; 3,3',4,4'-biphenyl tetracarboxylic dianhydride; 1,2,5,6-naphthalene tetracarboxylic dianhydride; 2,2',3,3'-biphenyl tetracarboxylic dianhydride; 3,3',4,4'-benzophenone tetracarboxylic dianhydride; 2,2-bis(3,4-dicarboxyphenyl)propane dianhydride; 3,4,9,10-perylene tetracarboxylic dianhydride; bis(3,4-dicarboxyphenyl) propane dianhydride; 1,1-bis(2,3-dicarboxyphenyl)ethane dianhydride; 1,1-bis(3,4-dicarboxyphenyl)ethane dianhydride; bis(2,3-dicarboxyphenyl)m-ethane dianhydride; bis(3,4-dicarboxyphenyl)ethane dianhydride; oxydiphthalic dianhydride; bis(3,4-dicarboxyphenyl)sulfone dianhydride; p-phenylenebis(trimellitic acid monoester anhydride; ethylene bis (trimellitic acid) monoester anhydride; bisphenol A bis (trimellitic acid) monoester anhydride; and their analogues. These compounds can be suitably used either individually or in a mixture of any proportions.

Examples of diamines that can be suitably used to produce the precursor of polyimide, i.e., the polyamic acid of the present invention, include: 4,4'-diaminophenylpropane; 4,4'-diaminophenylmethane; benzidine; 3,3'-dichlorobenzidine; 4,4'-diaminodiphenyl sulfide; 3,3'-diaminodiphenylsulfone; 4,4'-diaminodiphenylsulfone; 4,4'-diaminodiphenylether; 3,3'-diaminodiphenylether; 3,4'-diaminodiphenylether; 1,5-diaminonaphthalene; 4,4'-diaminodiphenyldiethylsilane; 4,4'-diaminodiphenylsilane; 4,4'-diaminodiphenyl ethylphosphine oxide; 4,4'-diaminodiphenyl N-methylamine; 4,4'-diaminodiphenyl N-phenylamine; 1,4-diaminobenzene (p-phenylenediamine); 1,3-diaminobenzene; 1,2-diaminobenzene, and their analogues. These compounds can be suitably used either individually or in a mixture of any proportions.

A preferred polyimide film is prepared by reaction of pyromellitic dianhydride and diaminodiphenylether. Another preferred polyimide film is prepared by reaction of pyromellitic dianhydride, diaminodiphenylether and p-phenylenediamine. In this combination, the molar ratio of diaminodiphenylether to p-phenylenediamine is 50/50 to 100/0, preferably 70/30 to 90/10. Another preferred polyimide film is prepared by reaction of 3,3',4,4'-biphenyltetracarboxylic dianhydride, pyromellitic dianhydride, p-phenylene diamine, and diaminodiphenylether. In this combination, the molar ratio of 3,3',4,4'-biphenyltetracarboxylic dianhydride to pyromellitic dianhydride is 30/70 to 50/50 and the molar ratio of diaminodiphenylether to p-phenylene diamine is 30/70 to 50/50.

The solvents that are preferably used for the synthesis of the polyamic acid are amide-family solvents, examples of which include N,N-dimethylformamide; N,N-dimethylacetoamide; and N-methyl-2-pyrrolidone. Among these compounds, it is preferable to use N,N-dimethylformamide and N,N-dimethylacetoamide either individually or in a mixture of any proportions.

A polyamic acid solution is usually obtained in a concentration of 5 wt % to 35 wt %, or more preferably 10 wt % to 30 wt %. With a concentration of polyamic acid solution in these ranges, a preferred molecular weight and a preferred solution viscosity can be obtained.

The polyimide is obtained by imidizing its precursor polyamic acid, which is carried out either by thermal curing or chemical curing. The thermal curing is a method in which the imidization reaction proceeds only by heating, without any action of a dehydrating agent or an imidizing catalyst, etc. The chemical curing is a method in which an organic solvent solution of polyamic acid is acted upon by a dehydrating agent as represented by acid anhydrides such as acetic acid anhydride, and by an imidizing catalyst as represented by tertiary amines such as isoquinoline, β-picoline, and pyridine. The chemical curing may be performed with the thermal curing. Reaction conditions of imidization vary depending on the type of polyamic acid, the thickness of the film, or the selected method of curing, which may be thermal curing and/or chemical curing.

In a producing process of the polyimide film of the present invention, a step of producing a partially cured and/or partially dried polyamic acid film (gel film) is carried out by a known method. Namely, the organic solvent solution of polyamic acid adjusted in the foregoing manner is cast or coated on a support such as a glass plate, an endless stainless-steel belt, or a stainless-steel drum, so as to carry out imidization by heating. Alternatively, the dehydrating agent and the catalyst are mixed in a polyamic acid solution at a low temperature and the polyamic acid solution is cast in the form of a film on a support and heated to activate the dehydrating agent and the imidizing catalyst. By this thermal imidization or chemical imidization, a partially cured self-supporting polyamic acid film (gel film) is produced. Note that, as the term is used herein, "partially cured" or "partially dried" means partial imidization of the amide bonds initially present in the polyamic acid solution, or partial evaporation or drying of a volatile component initially present in the initial polyamic acid solution. These terms do not mean partial curing or partial drying with respect to the entire surface of the film. The gel film is a film that is in an intermediate stage of curing from the polyamic acid to the polyimide and is self-supporting.

Thereafter, both sides in the transverse direction of the gel film are grasped using pins or clips, etc., and the gel film is carried to a heating furnace, where the gel film is dried to remove a volatile component such as an organic solvent. The film is then subjected to a heat treatment to obtain the polyimide film.

Any conventional or non-conventional method for manufacturing polyimide film can be used to manufacture the polyimide layer of the present invention. Examples of materials and methods are described in U.S. Pat. Nos. 3,616,177; 5,066,770; 5,070,181; and 5,081,229; which are all hereby incorporated by reference for all purposes.

The polyimide-fluoropolymer insulation structure of the present invention may be prepared by any suitable techniques as will now be apparent to the skilled artisan. For example, the polyimide layer may in one embodiment be laminated with the first and second fluoropolymer layers and the optional intervening layers by a lamination technique such as a transfer lamination. Alternatively the polyimide layer may be coated with a coating material that cures in place to form the optional intervening layers followed by applying a coating material that cures in place to form the first and second fluoropolymer layers.

Optionally, the major surfaces of the polyimide layer are prepared in advance to enhance adhesion of the fluoropolymer layers by surface treatment. Examples of surface treatments include corona treatment, plasma treatment under atmospheric pressure, plasma treatment under reduced pressure, treatment with coupling agents like silanes and titanates, sandblasting, alkali-treatment, and acid-treatment.

The method for producing the multilayer of polyimide-fluoropolymer insulation structure of the present invention preferably comprises;
a step of coating single surface or both surfaces of a polyimide film with a fluoropolymer dispersion, and
a step of drying and heating the fluoropolymer dispersion to form the fluoropolymer layer.

The step of drying and heating is preferably performed using a thermal treating furnace. The thermal treating furnace may consist of a baking zone and a fusing zone. The temperature in a thermal treating furnace may affect the adhesive property of the multilayer. As the temperature in the thermal treating furnace increases, the adhesive strength of the multilayer is enhanced.

In the case that the fluoropolymer dispersion comprises from about 70 to about 98% by weight (preferably from about 75 to about 98% by weight) of FEP and from about 30 to about 2% by weight (preferably from about 25 to about 2% by weight) of PTFE based on the total weight of the fluoropolymer, the maximum atmospheric temperature in the furnace is preferably 700° C. or higher. If the maximum atmospheric temperature is 700° C. or higher, the obtained composite exhibits exceptional internal adhesion strength. The preferable upper limit of maximum atmospheric temperature at furnace is 800° C.

In the case that the fluoropolymer dispersion comprises from about 70 to about 98% by weight (preferably from about 70 to about 90% by weight) of FEP and about 30 to about 2% by weight (preferably from about 30 to about 10% by weight) of PFA based on the total weight of the fluoropolymer, the maximum atmospheric temperature in the furnace is preferably 650° C. or higher. If the maximum atmospheric temperature is 650° C. or higher, the obtained composite exhibits exceptional copper adhesion strength.

In an embodiment of the present invention, the major surfaces of the polyimide layers are primed with an adhesion promoter material. Optionally, a priming layer may be used, such as a minor layer of FEP and/or of PTFE. While intermediate layers for enhancing bonding or to obtain other advantageous properties are contemplated, the external layers of the polyimide-fluoropolymer insulation structure are the first and second fluoropolymer layers as described herein.

The optional intervening layer or layers may be provided between the first major surface of the polyimide base layer and the first fluoropolymer layer, between the second major surface of the polyimide base layer and the second fluoropolymer layer, or between each major surface of the polyimide base layer and the first and second fluoropolymer layers. The thickness of the optional intervening layer or layers is not critical to the invention. Representative examples of thicknesses that may be used for this layer are independently in the range of from about 0.05 to 0.5 mil.

The optional intervening layers may be selected from a wide variety of materials. Examples of materials useful as the intervening layer or layers include PTFE, FEP, PFA, polyvinylchloride (PVC), PVDF, ECTFE, CTFE, PCTFE, polyamideimide, poly(ether ether ketone), polysulfone, poly(ether sulfone), poly(ether imide), etc.

When two or more intervening layers are employed they may be different materials and have different thicknesses.

In the case that the fluoropolymer layer comprises from about 70 to about 98% by weight (preferably from about 75 to about 98% by weight) of FEP and from about 30 to about 2% by weight (preferably from about 25 to about 2% by weight) of PTFE based on the total weight of the first fluoropolymer layer, a multilayer of polyimide-fluoropolymer insulation structure is provided that in particular exhibits excellent internal adhesive strength. Due to this property, the multilayer described above provides sufficient internal adhesive strength without intervening layers.

In the case that the fluoropolymer layer comprises from about 70 to about 90% by weight of FEP and from about 30 to about 10% by weight of PFA based on the total weight of the first fluoropolymer layer, a multilayer of polyimide-fluoropolymer insulation structure is provided that in particular exhibits excellent copper adhesive strength in addition to regular adhesive strength. Therefore, the fluoropolymer layer described above is preferably used as an exterior layer of the multilayer which is bonded to a conductor.

In a preferred embodiment of the present invention, the composite is symmetrical, meaning that the first fluoropolymer layer and the second fluoropolymer layer have the same chemical make-up. This embodiment provides substantial benefit in ease of production, reduction of the number of materials needed to stock in the factory, ease of use, and demonstrated performance of the product.

The first fluoropolymer layer is preferably on the first major surface of the polyimide layer, and the second fluoropolymer layer is preferably on the second major surface of the polyimide layer.

Preferably, the present polyimide-fluoropolymer insulation structure consists of only the three layers as described herein, with no identifiable additional continuous layers being present in the composite. This simple three layer construction has been found to provide excellent performance properties, and additionally may be made in a straightforward process and is easy to use. The preferred three layer construction provides significant manufacturing and cost reduction advantages.

The multilayer polyimide-fluoropolymer insulation structure of the present invention may be applied to electronic material such as wire or cable in any manner suitable to provide protection of the electronic material in ordinary operation. A multilayer polyimide-fluoropolymer insulation structure in accordance with the present invention can be used as all or part of a housing for one or more conductive wires or cables, such as a wire or cable wrap or as a housing component of a "flat wire" as commonly used in aerospace wiring applications. Preferably, the multilayer polyimide-fluoropolymer insulation structure is provided in the form of a tape that is wound around the wire or cable and then heated to bond the wrap to itself and to the wire or cable or the like. Most preferably, when the multilayer polyimide-fluoropolymer insulation structure is coated on only one side, the fluorine-coated side of the insulation structure is positioned to be in contact with the any metal component to be insulated, and in particular in contact with copper. For example, a copper wire is preferably insulated by wrapping the insulation structure around the wire, with the fluorine-coated side of the insulation structure being positioned to be in contact the copper wire.

EXAMPLES

Representative embodiments of the present invention will now be described with reference to the following examples that illustrate the principles and practice of the present invention.

The First Embodiment

A 1.00 mil polyimide film of Apical AV was coated with an aqueous dispersion blend of FEP and PTFE, such that a 0.05 mil resin coating was obtained containing the indicated amounts of PTFE and FEP by weight % on both faces of the polyimide film. These coatings were applied in a conventional dip coating tower with an evaporation and baking zone of 6 feet in length and a fusing zone of 4 feet in length at a line speed of 40 feet per minute. The atmospheric temperature in the fusing zone was about 1200° F. (649° C.) to about 1400° F. (760° C.) (the web temperature was from 750 to 1000 F).

The amounts of FEP and PTFE were as follows:

| Example | FEP (wt %) | PTFE (wt %) |
| --- | --- | --- |
| 1 (comparative) | 60 | 40 |
| 2 | 80 | 20 |
| 3 | 90 | 10 |
| 4 | 95 | 5 |
| 5 | 98 | 2 |
| 6 (comparative) | 100 | 0 |

Figure 2:
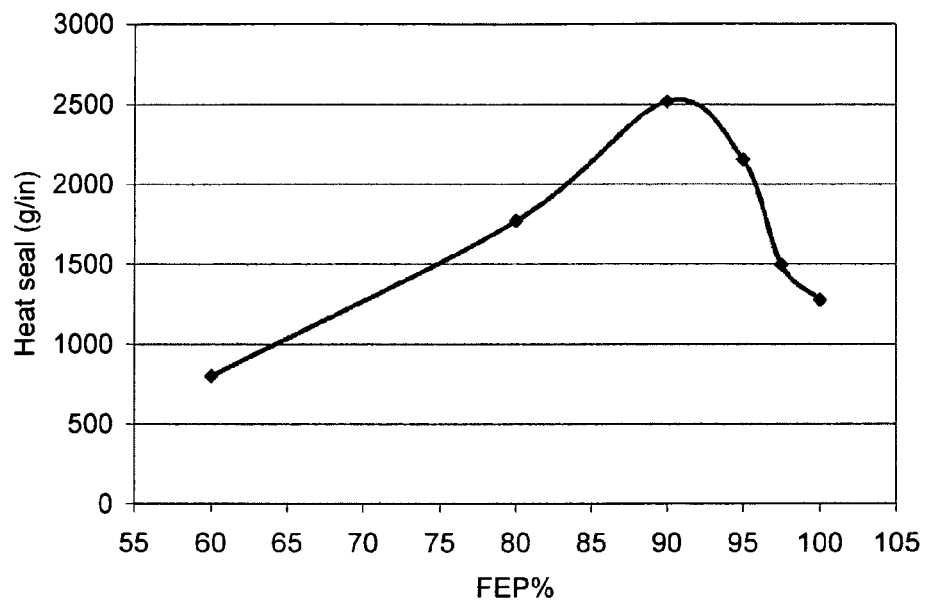
FIG. 2 is a graph showing heat seal strength of samples of polyimide-fluoropolymer insulation structures comprising various amounts of FEP in the fluoropolymer layers of the structures for the first embodiment.

The samples of the above Examples were tested in accordance with the Heat-seal Strength test protocol of ASTM Test D 2305-99 to determine the bond strength that occurs when a heat sealable film is bonded to the coated side of a like film. A graph displaying the results of this testing is shown in FIG. 2. While the prior art indicated that FEP is used as a coating material to enhance bonding of heat sealable electrical insulative films, surprisingly it was found that the incorporation of the indicated amounts of PTFE in the FEP-based fluoropolymer layer increased the observed heat seal properties as compared to fluoropolymer layers comprising 100% FEP. Surprisingly, polyimide-fluoropolymer insulation structures of the present invention can achieve up to about two times the heat-seal strength of prior art polyimide-fluoropolymer insulation structures that are commercially available.

The Second Embodiment

Lab Scale Testing

A 1.00 mil polyimide film of Apical AV was coated with an aqueous dispersion blend of FEP and PFA, such that a 0.15 mil resin coating was obtained containing 20% by weight PFA and 80% by weight of FEP on each side of the polyimide film. Likewise, samples were prepared having resin coatings on each side of the film containing 10% by weight PFA and 90% by weight of FEP, and 30% by weight PFA and 70% by weight of FEP. These coatings were hand drawn and placed in an oven to dry for 60 seconds. The temperature of the drying oven was as reported in Table 1 below for each of the samples.

The resulting multilayer polyimide-fluoropolymer insulation structures were tested in accordance with the Heat-seal Strength test protocol of ASTM Test D 2305-99 to determine the bond strength that occurs when a heat sealable film is bonded to the coated side of a like film, or to a copper sheet of the same dimensions and having a thickness of 1.4 mil. In this test, the Instron tensile testing machine was operated with a jaw separation rate of 12 in/min.

The heat seal strength data of the various samples is reported in Table 1 below.

TABLE 1

| Example | Temperature[1] (° C.) | FEP | PFA | FEP/FEP[2] | Copper (20)[3] | Copper (60)[4] |
| --- | --- | --- | --- | --- | --- | --- |
| 1 | 495 | 70 | 30 | 1517 | 1178 | 1293 |
| 2 | 450 | 70 | 30 | 1117 | 485 | 721 |
| 3 | 495 | 80 | 20 | 1650 | 1345 | 887 |
| 4 | 450 | 80 | 20 | 1159 | 459 | 1052 |
| 5 | 400 | 80 | 20 | 77 | 237 | NA |
| 6 | 495 | 90 | 10 | 834 | 1246 | 1078 |
| 7 | 450 | 90 | 10 | 1173 | 462 | 664 |

[1]Temperature of drying oven
[2]FEP/FEP denotes the measurement of the heat seal between two layers of insulation material, fluoropolymer layers in contact.
[3]Copper (20) denotes the measurement of the heat seal between the fluoropolymer and copper foil, wherein the sample is held in the jaw sealer for 20 seconds
[4]Copper (60) denotes the measurement of the heat seal between the fluoropolymer and copper foil, wherein the sample is held in the jaw sealer for 60 seconds The data of Table 1 shows that the temperature used for drying the fluoropolymer layer has an impact on the strength of the ultimate heat seal, and that the fluoropolymer layer composition of 80% FEP/20% PFA provides generally better performance than other tested compositions.

Production Scale Testing

A 1.00 mil polyimide film of Apical AV was coated with an aqueous dispersion blend of FEP and PFA, such that a 0.15 mil resin coating was obtained containing 20% by weight PFA and 80% by weight of FEP on each side of the polyimide film. These coatings were applied in a conventional dip coating tower with evaporation and baking zone of six feet in length and a fusing zone of four feet in length at various line speeds to evaluate the effect of different amounts of drying time on the ultimate heat seal. The atmospheric temperature in the fusing zone was about 1300° F. (704° C.). Values of copper heat seal were determined by the test procedure described above.

Figure 3:
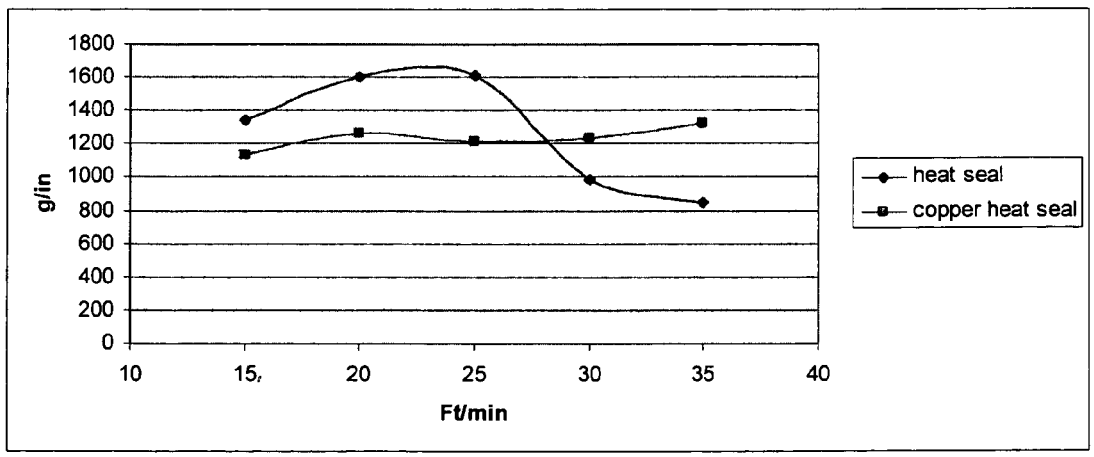
FIG. 3 is a graph showing heat seal strength of samples of polyimide-fluoropolymer insulation structures as a function of the coating speed of the film during the coating process for the second embodiment.

FIG. 3 is a graph showing the copper heat seal strength (in grams/inch) of multilayer polyimide-fluoropolymer insulation structures having a fluoropolymer layer compositions of 80% FEP/20% PFA as a function of coating speed of the film (in feet/min). As can be seen in FIG. 3, the above fluoropolymer layer composition exhibits both high and consistent copper heat seal strengths regardless of dry time within the parameters as tested. Additionally the above fluoropolymer layer composition exhibits high copper heat seal strengths that can additionally be optimized by selection of preferred dry times.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A multilayer of polyimide-fluoropolymer insulation structure comprising:
   a) a base layer of polyimide having first and second major surfaces; and
   b) a first fluoropolymer layer comprising from about 70 to about 98% by weight of FEP and from about 30 to about 2% by weight of PFA based on the total weight of the first fluoropolymer layer; and
   c) a second fluoropolymer layer comprising from about 70 to about 98% by weight of FEP and from about 30 to about 2% by weight of PFA based on the total weight of the second fluoropolymer layer; wherein the multilayer polyimide-fluoropolymer insulation structure construction consists of only the three layers of the base layer of polyimide and the first and second fluoropolymer layers, with no identifiable additional continuous layers being present in the composite.

2. The multilayer polyimide-fluoropolymer insulation structure of claim 1, wherein the first and second fluoropolymer layers comprise from about 70 to about 90% by weight of FEP and from about 30 to about 10% by weight of PFA based on the total weight of the respective fluoropolymer layers.

3. The multilayer polyimide-fluoropolymer insulation structure of claim 2, wherein the first and second fluoropolymer layers comprise from about 75 to about 85% FEP and from about 25 to about 15% by weight of PFA based on the total weight of the respective fluoropolymer layers.

4. The multilayer polyimide-fluoropolymer insulation structure of claim 1, wherein the thickness of the base layer of polyimide ranges from about 0.5 to about 5 mil.

5. The multilayer polyimide-fluoropolymer insulation structure of claim 1, wherein the thickness of the first fluoropolymer layer and of the second fluoropolymer layer range from about 0.05 to about 0.2 mil.

6. The multilayer polyimide-fluoropolymer insulation structure of claim 1, wherein the first fluoropolymer layer and the second fluoropolymer layer have the same chemical make-up.

7. The multilayer polyimide-fluoropolymer insulation structure of claim 1, wherein the base layer of polyimide is made from one or more aromatic acid dianhydrides and one or more aromatic diamines.

8. The multilayer polyimide-fluoropolymer insulation structure of claim 1, wherein the base layer of polyimide is made from pyromellitic dianhydride and diaminodiphenylether.

9. The multilayer polyimide-fluoropolymer insulation structure of claim 1, wherein the base layer of polyimide is prepared from a polyamic acid that is the reaction product of pyromellitic dianhydride and diaminodiphenylether and p-phenylenediamine, wherein the molar ratio of diaminodiphenylether to p-phenylenediamine is from about 50/50 to about 100/0.

10. The multilayer polyimide-fluoropolymer insulation structure of claim 1, wherein the base layer of polyimide is prepared from a polyamic acid that is the reaction product of 3,3',4,4'-biphenyltetracarboxylic dianhydride, pyromellitic dianhydride, p-phenylene diamine, and diaminodiphenylether, wherein the molar ratio of 3,3',4,4'-biphenyltetracarboxylic dianhydride to pyromellitic dianhydride is from about 30/70 to about 50/50 and the molar ratio of diaminodiphenylether to p-phenylene diamine is from about 30/70 to about 50/50.

11. A protected wire or cable, wherein the wire or cable is wrapped with the multilayer polyimide-fluoropolymer insulation structure of claim 1.

12. A method for insulating wire or cable, comprising
   a) providing a wire or cable, and
   b) wrapping the wire or cable with the multilayer polyimide-fluoropolymer insulation structure of claim 1 in a manner to provide electrical insulative protection.

13. The multilayer polyimide-fluoropolymer insulation structure of claim 1, wherein the structure has been prepared by heating to a temperature of 650° C. or higher.

14. A multilayer of polyimide-fluoropolymer insulation structure comprising:
   a) a base layer of polyimide having first and second major surfaces;
   b) a first fluoropolymer layer comprising from about 85 to about 95% by weight of FEP and from about 15 to about 5% by weight of PTFE based on the total weight of the first fluoropolymer layer; and
   c) a second fluoropolymer layer comprising from about 85 to about 95% by weight of FEP and from about 15 to about 5% by weight of PTFE based on the total weight of the second fluoropolymer layer;
   wherein the first fluoropolymer layer and the second fluoropolymer layer have the same chemical make-up, wherein the multilayer polyimide-fluoropolymer insulation structure construction consists of only the three layers of the base layer of polyimide and the first and second fluoropolymer layers, with no identifiable additional continuous layers being present in the composite.

15. A protected wire or cable, wherein the wire or cable is wrapped with the multilayer polyimide-fluoropolymer insulation structure of claim 14.

16. A method for insulating wire or cable, comprising
a) providing a wire or cable, and
b) wrapping the wire or cable with the multilayer polyimide-fluoropolymer insulation structure of claim 14 in a manner to provide electrical insulative protection.

17. The multilayer polyimide-fluoropolymer insulation structure of claim 14, wherein the thickness of the base layer of polyimide ranges from about 0.5 to about 5 mil.

18. The multilayer polyimide-fluoropolymer insulation structure of claim 14, wherein the thickness of the first fluoropolymer layer and of the second fluoropolymer layer range from about 0.05 to about 0.2 mil.

19. The multilayer polyimide-fluoropolymer insulation structure of claim 14, wherein the structure has been prepared by heating to a temperature of 700° C. or higher.

* * * * *